United States Patent
Honda

(10) Patent No.: US 7,738,043 B2
(45) Date of Patent: Jun. 15, 2010

(54) NOISE REDUCING CIRCUIT, NOISE REDUCING METHOD, AND VIDEO APPARATUS

(75) Inventor: Yuichi Honda, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/511,760

(22) Filed: Jul. 29, 2009

(65) Prior Publication Data

US 2009/0284661 A1    Nov. 19, 2009

Related U.S. Application Data

(63) Continuation of application No. PCT/JP2008/066801, filed on Sep. 10, 2008.

(30) Foreign Application Priority Data

Nov. 30, 2007   (JP)   ............... 2007-311651

(51) Int. Cl.
*H04N 5/00* (2006.01)
*H04N 5/50* (2006.01)

(52) U.S. Cl. ............... 348/607; 348/620; 348/622; 348/731

(58) Field of Classification Search ......... 348/606–607, 348/618, 620, 622–625, 627–629, 669, 683, 348/731, 701–702, E5.001, E5.097; *H04N 5/00, H04N 5/50*

See application file for complete search history.

(56) References Cited

U.S. PATENT DOCUMENTS

| | | | |
|---|---|---|---|
| 3,868,577 A | 2/1975 | Watt | |
| 4,531,095 A | 7/1985 | Ishigaki et al. | |
| 4,709,269 A * | 11/1987 | Ozaki | ............... 348/622 |
| 5,005,081 A | 4/1991 | Asano | |
| 5,268,760 A | 12/1993 | Suyama | |
| 5,285,277 A | 2/1994 | Min | |
| 5,311,087 A | 5/1994 | Suganuma | |
| 5,668,914 A * | 9/1997 | Inuiya et al. | ............... 386/46 |

(Continued)

FOREIGN PATENT DOCUMENTS

JP    04-020182    1/1992

(Continued)

OTHER PUBLICATIONS

Notification of Transmittal of International Search Report and Written Opinion of the Interanational Searching Authority in a corresponding Japanese application; application No. PCT/JP2008/066801 dated Nov. 4, 2008.

*Primary Examiner*—Trang U Tran
(74) *Attorney, Agent, or Firm*—Blakely, Sokoloff, Taylor & Zafman LLP

(57) ABSTRACT

According to one embodiment, a noise reducing circuit includes a frame memory configured to frame-delay a video signal, a first arithmetic unit configured to subtract the frame-delayed video signal given by the frame memory from the video signal to output a first frame difference signal, a first rectangular wave removing unit configured to remove a rectangular wave component from the first frame difference signal to generate a second frame difference signal, a first pulse discriminating unit configured to receive the second frame difference signal, remove a continuous pulse component from the second frame difference signal, and output a single pulse component, and a second arithmetic unit configured to subtract the single pulse component from the video signal.

9 Claims, 14 Drawing Sheets

U.S. PATENT DOCUMENTS 7,440,035 B2 * 10/2008 Mori .......................... 348/518
7,602,440 B2 * 10/2009 Nishi et al. ................. 348/441

FOREIGN PATENT DOCUMENTS

| | | |
|---|---|---|
| JP | 05-145802 | 6/1993 |
| JP | 7-24862 | 5/1995 |
| JP | 07-274045 | 10/1995 |
| JP | 3286120 | 1/1997 |
| JP | 10-013718 | 1/1998 |
| JP | 3308705 | 7/2002 |

* cited by examiner

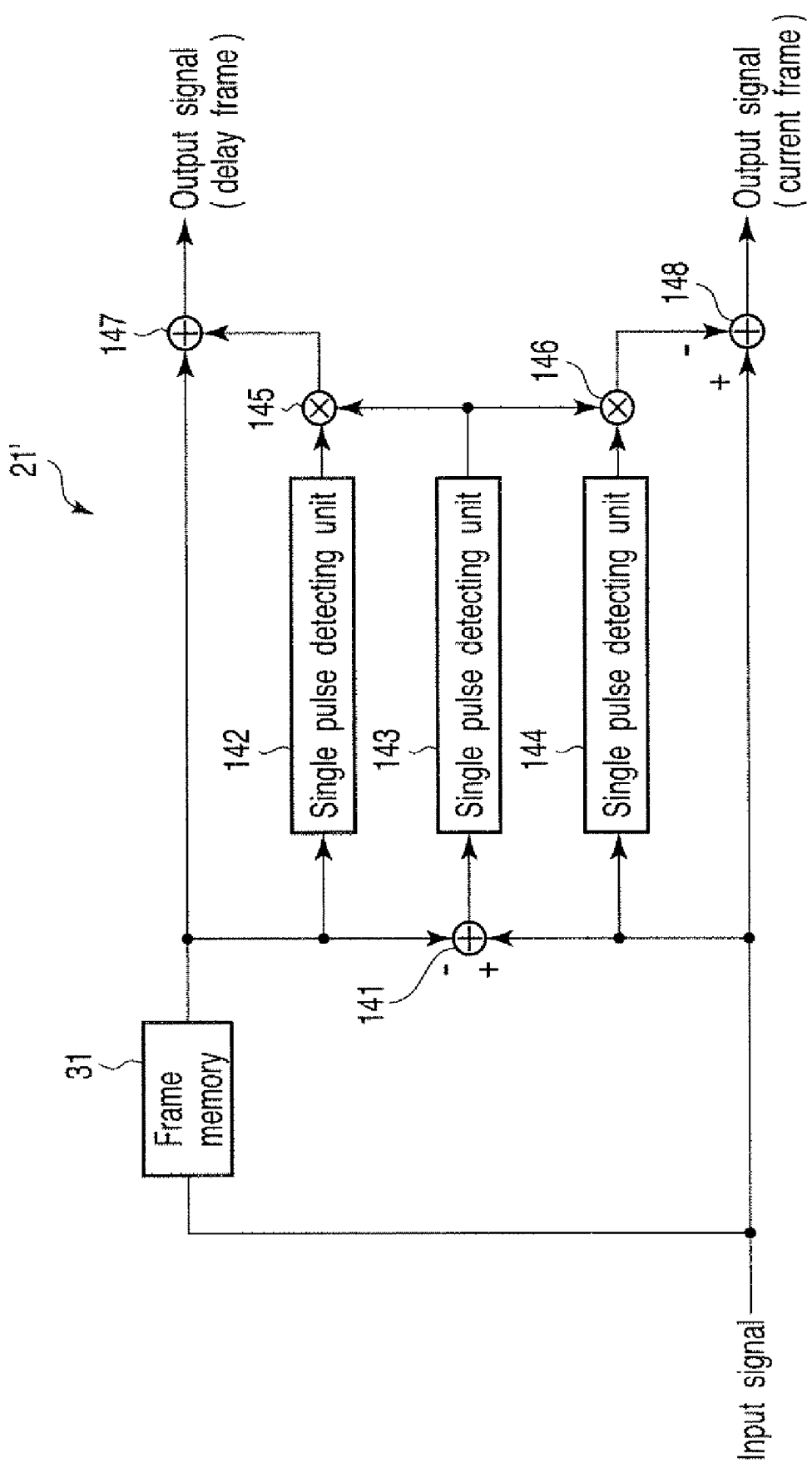
F I G. 13

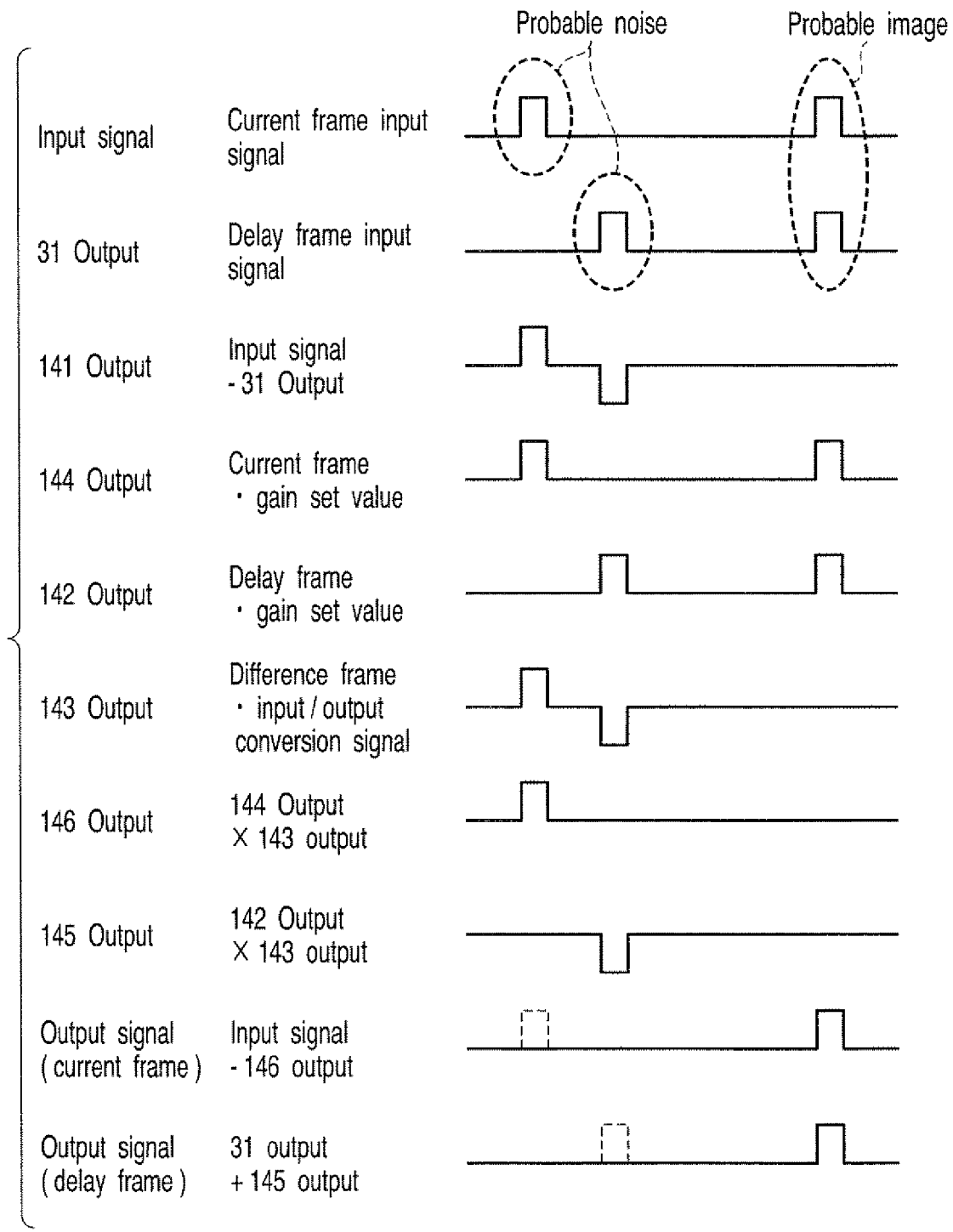
F I G. 14

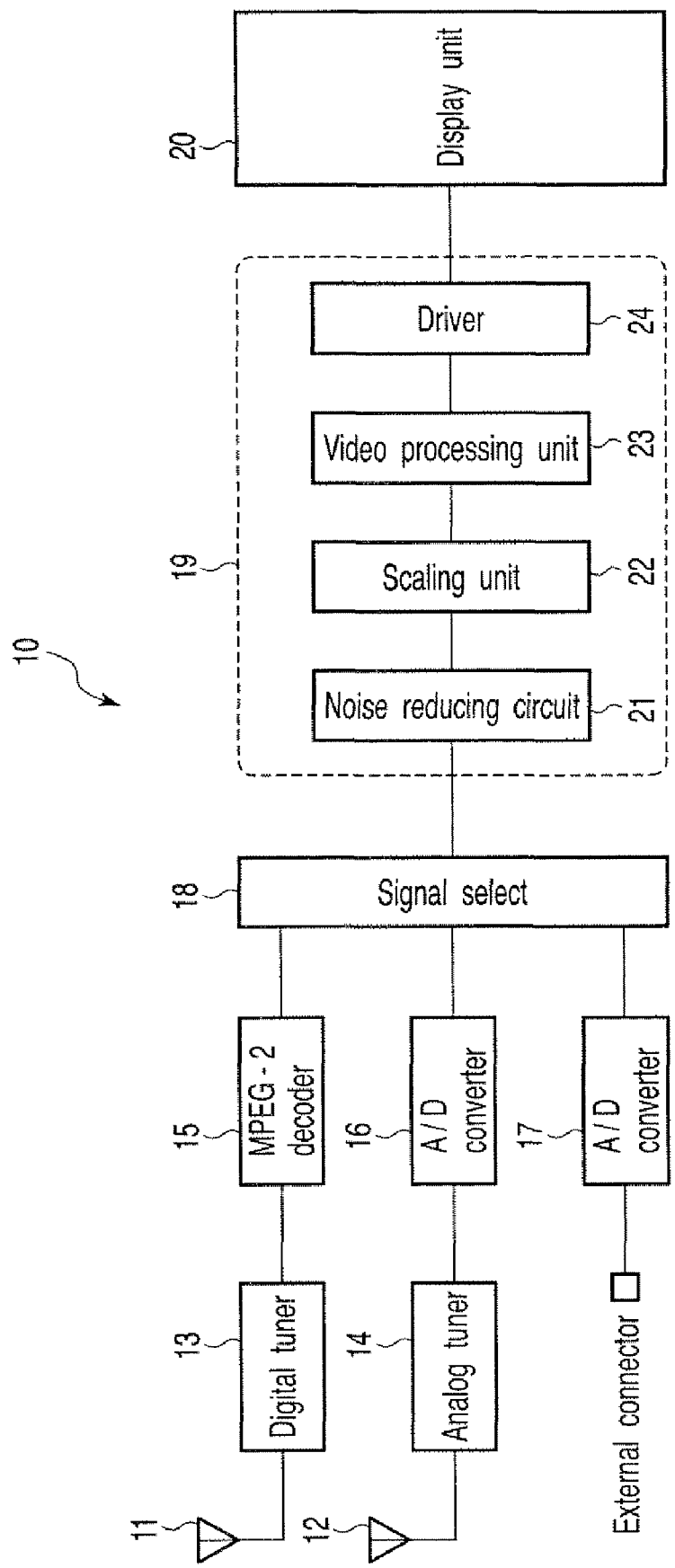
F I G. 15

NOISE REDUCING CIRCUIT, NOISE REDUCING METHOD, AND VIDEO APPARATUS

CROSS-REFERENCE TO RELATED APPLICATIONS

This is a Continuation Application of PCT Application No. PCT/JP2008/066801, filed Sep. 10, 2008, which was published under PCT Article 21 (2) in English.

This application is based upon and claims the benefit of priority from Japanese Patent Application No. 2007-311651, filed Nov. 30, 2007, the entire contents of which are incorporated herein by reference.

BACKGROUND

1. Field

One embodiment of the invention relates to a noise reducing circuit, a noise reducing method, and a video apparatus which remove a rectangular wave component and a continuous pulse component from a noise component to output a single pulse component.

2. Description of the Related Art

In recent years, in an impulse noise removing apparatus, a large number of schemes which reduce impulse noise error detection in a moving image are known.

Patent Document 1 discloses a technique which can determine the presence/absence of a single impulse noise component having a large change in luminance and included in a video signal.

[Patent Document 1] Jpn. Pat. Appln. KOKAI Publication No. 5-145802

BRIEF DESCRIPTION OF THE SEVERAL VIEWS OF THE DRAWINGS

A general architecture that implements the various feature of the invention will now be described with reference to the drawings. The drawings and the associated descriptions are proved to illustrate embodiments of the invention and not to limit the scope of the invention.

FIG. 13 is a block diagram showing an example of another configuration of a noise reducing circuit according to an embodiment of the present invention.

FIG. 14 is a timing chart showing an example of an operation of a noise reducing circuit according to an embodiment of the present invention.

FIG. 15 is a block diagram showing an example of a configuration of a video apparatus to which a noise reducing circuit according to an embodiment of the present invention is applied.

DETAILED DESCRIPTION

Various embodiments according to the invention will be described hereinafter with reference to the accompanying drawings. In general, according to one embodiment of the invention, a noise reducing circuit including a frame memory configured to frame-delay a video signal, a first arithmetic unit configured to subtract the frame-delayed video signal given by the frame memory from the video signal to output a first frame difference signal, a first rectangular wave removing unit configured to remove a rectangular wave component from the first frame difference signal to generate a second frame difference signal, a first pulse discriminating unit configured to receive the second frame difference signal, remove a continuous pulse component from the second frame difference signal, and output a single pulse component, and a second arithmetic unit configured to subtract the single pulse component from the video signal.

Embodiments of the present invention will be described below in detail with reference to the accompanying drawings.

Figure 1:
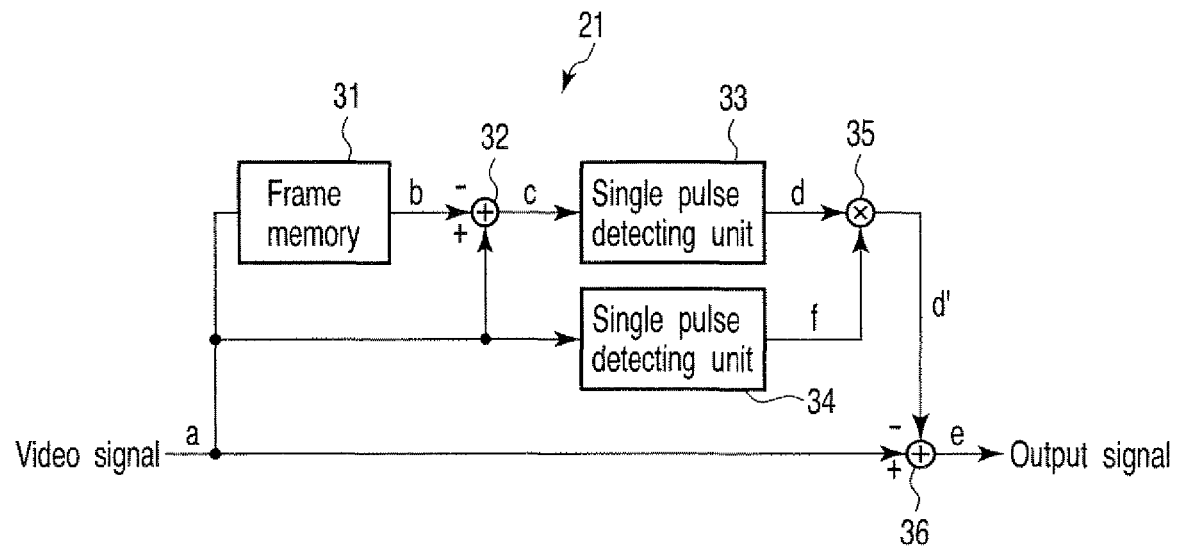
FIG. 1 is a block diagram showing an example of a configuration of a noise reducing circuit according to an embodiment of the present invention.
Figure 2:
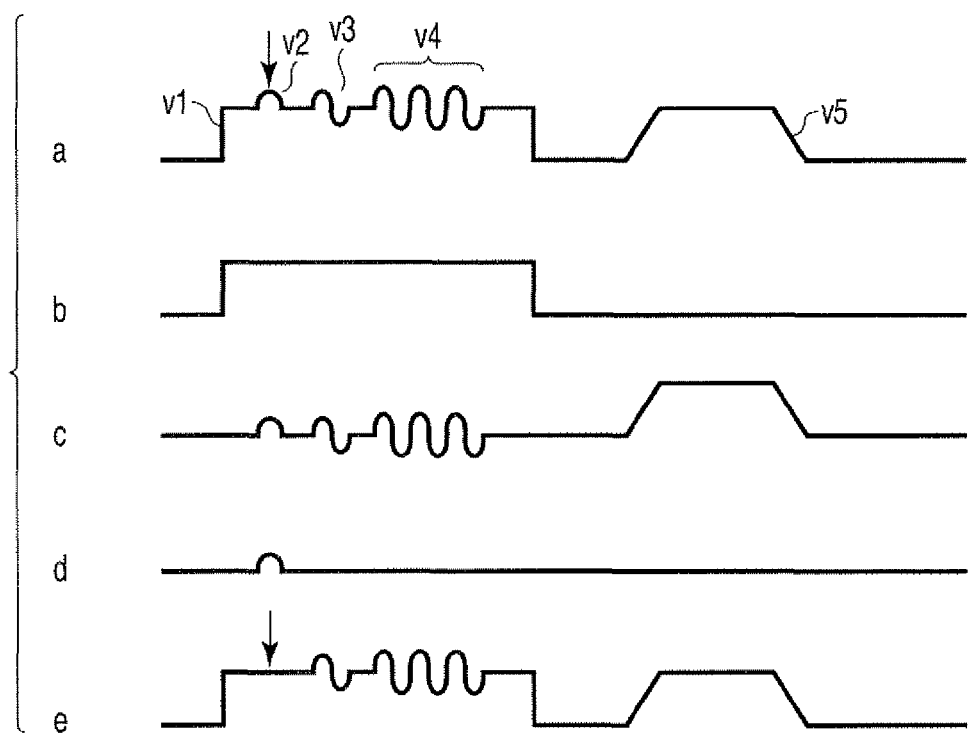
FIG. 2 is a timing chart showing an example of an operation of the noise reducing circuit according to an embodiment of the present invention.

FIG. 1 is a block diagram showing an example of a configuration of a noise reducing circuit according to an embodiment of the present invention. FIG. 2 is a timing chart showing an example of an operation of a noise reducing circuit according to an embodiment of the present invention. A configuration and an operation of a noise reducing circuit 21 will be described with reference to FIGS. 1 and 2.

The noise reducing circuit 21 includes a frame memory 31, an arithmetic unit 32, a first single pulse detecting unit 33, a second single pulse detecting unit 34, an arithmetic unit 35, and an arithmetic unit 36.

The frame memory 31 stores a video signal of 1 frame and outputs a video signal before 1 frame (frame delay signal) b. The arithmetic unit 32 calculates a frame difference signal c between a video signal a and the video signal b. The first single pulse detecting unit 33 extracts a single pulse included in the frame difference signal c as a single pulse component d.

The second single pulse detecting unit 34 detects a size of a single pulse included in the video signal a, and generates an output f expressing, for example, a 0 to 1 time coefficient depending on an amplitude of the detected pulse. The arithmetic unit 35 multiplies an amplitude of a pulse of the single pulse component output d by the coefficient determined by the output f to generate a single pulse component d' obtained by changing the amplitude of the pulse of the single pulse component d. The arithmetic unit 36 outputs an output signal e obtained by subtracting the single pulse component d' from the video signal a.

In the video signal a shown in FIG. 2, pulse signals v2, v3, and v4 are superposed on a rectangular signal v1, and a rectangular signal v5 is present. The pulse signal mentioned here is turned on or off in units of pixels, and the rectangular signal is a signal in which a plurality of continuous pixels are turned on.

In the video signal a, the rectangular signals v1 and v5 are signals expressing a video but noise. The single pulse signal v2 in which only one pixel is turned on is noise, and a signal to be processed by the noise reducing circuit 21. The continuous pulse signals v3 and v4 in which a plurality of pixels are repeatedly turned on or off may be noise or video signals.

In a noise reducing circuit according to the embodiment described below has a β mode in which only a single pulse is detected and an α mode in which a single pulse and continuous pulses are detected.

First Embodiment

The first single pulse detecting unit 33 which is a main part of a noise reducing circuit according to an embodiment of the present invention will be described below in detail with reference to drawings.

Figure 3:
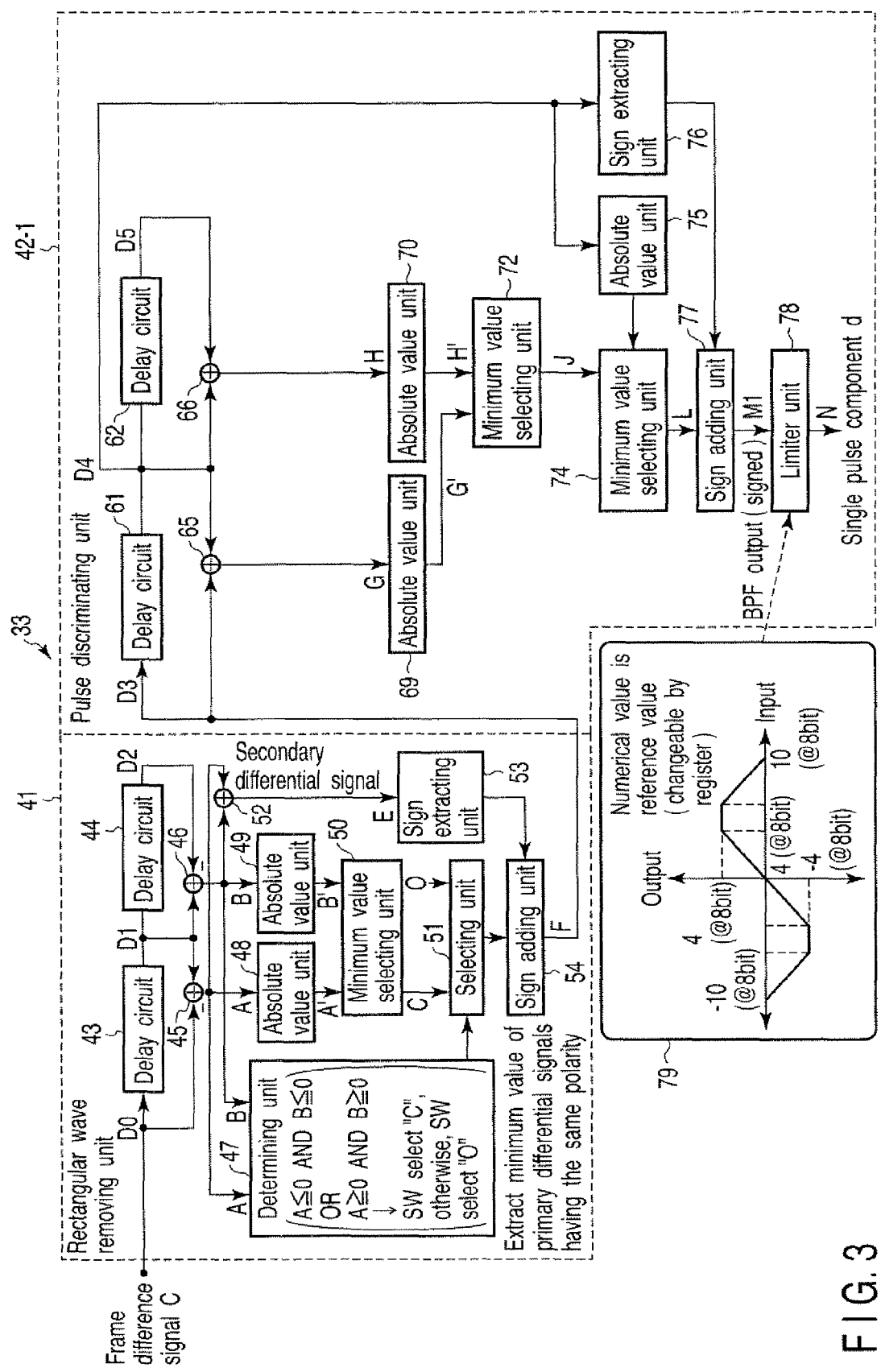
FIG. 3 is a block diagram showing an example of a configuration of a single pulse detecting unit which is a main configuration of the noise reducing circuit according to an embodiment of the present invention.
Figure 4:
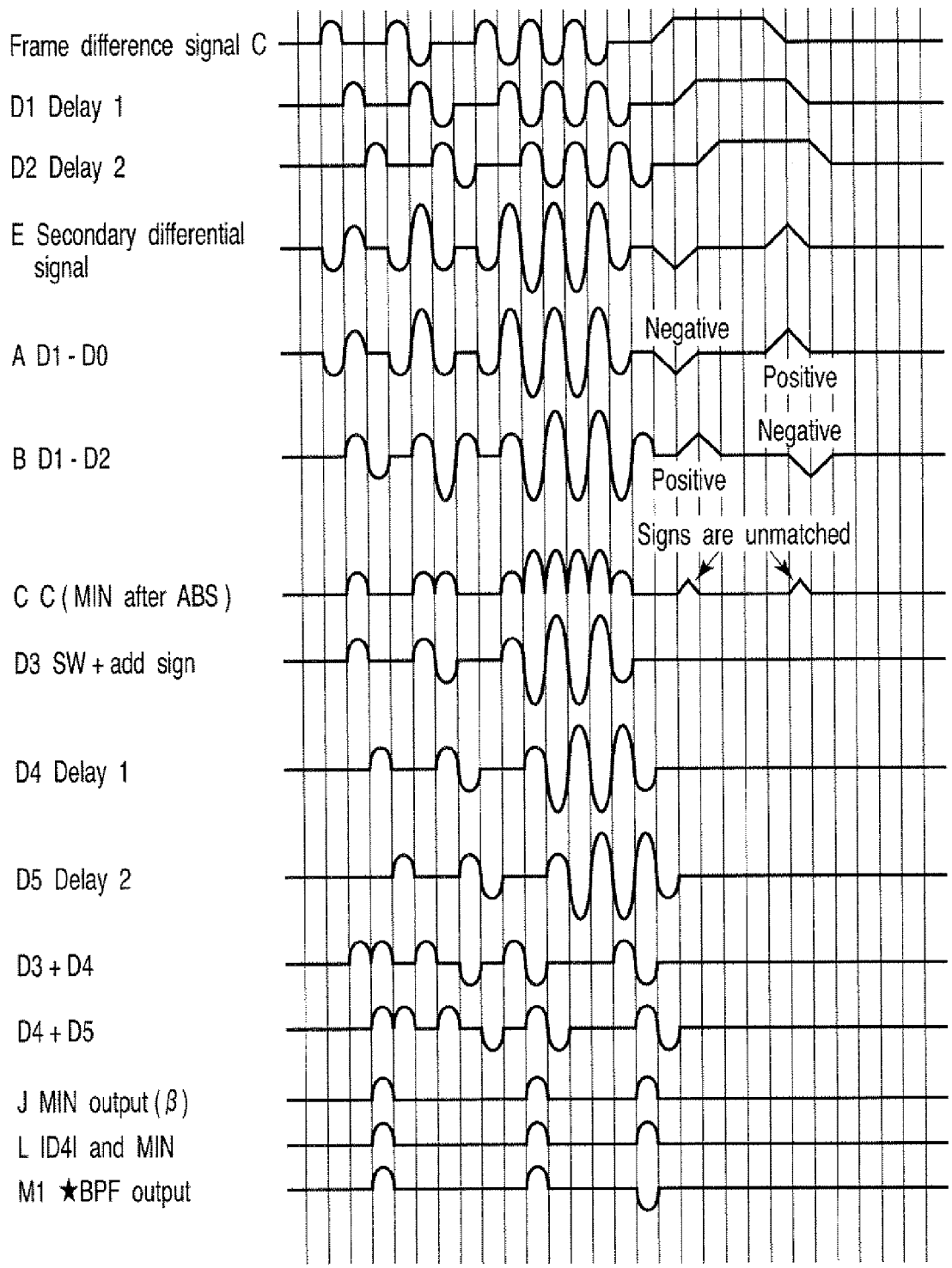
FIG. 4 is a timing chart showing an example of an operation of a single pulse detecting unit which is a main configuration of a noise reducing circuit according to an embodiment of the present invention.

FIG. 3 is a circuit diagram showing a configuration of the first single pulse detecting unit 33. The first single pulse detecting unit 33 shown in FIG. 3 is a β mode configuration which detects a single pulse signal. FIG. 4 is a timing chart showing an example of an operation of the first single pulse detecting unit 33.

The first single pulse detecting unit 33 includes a rectangular wave removing unit 41 and a pulse discriminating unit 42-1. The rectangular wave removing unit 41 removes a rectangular wave signal from the frame difference signal c. The pulse discriminating unit 42-1 discriminates continuous pulses and a single pulse from an output signal from the rectangular wave removing unit 41 to extract only the single pulse.

[Rectangular Wave Removing Unit]

An operation of the rectangular wave removing unit 41 will be described below with reference to FIGS. 3 and 4.

In the rectangular wave removing unit 41, a frame difference signal c (D0) is supplied to a delay circuit 43. The delay circuit 43 outputs a delay signal D1. The delay signal D1 is supplied to a delay circuit 44. In the delay circuit 44, a further delayed delay signal D2 is output.

The delay circuit 43 and 44 mentioned here are memories operating in units of pixels. Therefore, the delay signal D1 is a signal delayed by one pixel with respect to the frame difference signal c. The delay signal D2 is a signal delayed by 2 pixels with respect to the frame difference signal c.

It must be noticed that the delay circuit 43 and 44 may be memories operating in several units of pixels. Therefore, the delay signal D1 may be a signal delayed by a first pixel number with respect to the frame difference signal C. The delay signal D2 may be a signal delayed by a second pixel number with respect to the frame difference signal c.

An adder 45 subtracts the frame difference signal c from the delay signal D1 to generate an output A. An adder 46 subtracts the delay signal D2 from the delay signal D1 to generate an output B.

The output A and the output B are difference signals between two signals with reference to the delay signal D1. However, in this specification, the difference signals are called differential signals. More specifically, the differential signals are difference signals between the two signals. A secondary differential signal is a difference signal of two differential signal.

In this case, it must be noticed that the difference is calculated with reference to the delay signal D1 by the output A and the output B. Because this will allow the determination of polarities of the output A and the output B.

The output A is input to an absolute value unit 48. The absolute value unit 48 generates an absolute value signal A' obtained by converting a negative signal of the output A into a positive signal. The output B is input to an absolute value unit 49. The absolute value unit 49 generates an absolute value signal B' obtained by converting a negative signal of the output B into a positive signal. A minimum value selecting unit 50 selects a smaller one of the absolute value signal A' and the absolute value signal B' to output the signal as a signal C.

On the other hand, the output A and the output B are input to a determining unit 47. In this case, the determining unit 47 examines the polarities of the signals. The determining unit 47 outputs a signal representing whether the polarities of the output A and the output B are equal to or different from each other to a selecting unit 51. More specifically, when the signals A and B satisfy $A \leqq 0$ and $B \leqq 0$, or when $A \geqq 0$ and $B \geqq 0$ are determined, the determining unit 47 outputs a signal representing that the polarities of both the signals are equal to each other to the selecting unit 51. When the signals A and B satisfy $A \leqq 0$ and $B > 0$, or when $A \geqq 0$ and $B < 0$ are determined, the determining unit 47 outputs a signal representing that the polarities of both the signals are different from each other to the selecting unit 51.

When the signal from the determining unit 47 represents "polarities are equal to each other", the selecting unit 51 selects an output C from the minimum value selecting unit 50. The selecting unit 51 selects a signal having a value=0 when the signal from the determining unit 47 represents that "polarities are different from each other". The selecting unit 51 outputs the selected signal to a sign adding unit 54.

With the operations of the determining unit 47 and the selecting unit 51, a rectangular wave signal corresponding to a rectangular signal V5 is removed. More specifically, parts corresponding to both the end parts of the rectangular wave signals present in the output A and the output B are not output because the parts have different polarities, and a signal having a value of 0 is output in place of the parts.

On the other hand, the output A and the output B are added to each other in an adder 52. Since the operation corresponds to an operation of subtracting the inverted output B from the output A, it can be interpreted that the adder 52 generates a secondary differential signal E. The secondary differential signal E serving as an output from the adder 52 is supplied to a sign extracting unit 53 to extract sign information. For example, the sign is "+" when the secondary differential signal is positive, the sign is "−" when the secondary differential signal is negative. Extracted sign information is sent to the sign adding unit 54.

The sign adding unit 54 adds the extracted sign information to the output from the selecting unit 51. The signal selected by the selecting unit 51 is converted into an absolute value by the absolute value units 48 and 49. Therefore, the sign adding unit 54 adds a sign to convert the signal into a signal having an original sign. A signed output signal F (video signal D3) of the sign adding unit 54 is supplied to the pulse discriminating unit 42-1 serving as a latter part.

Figure 5:
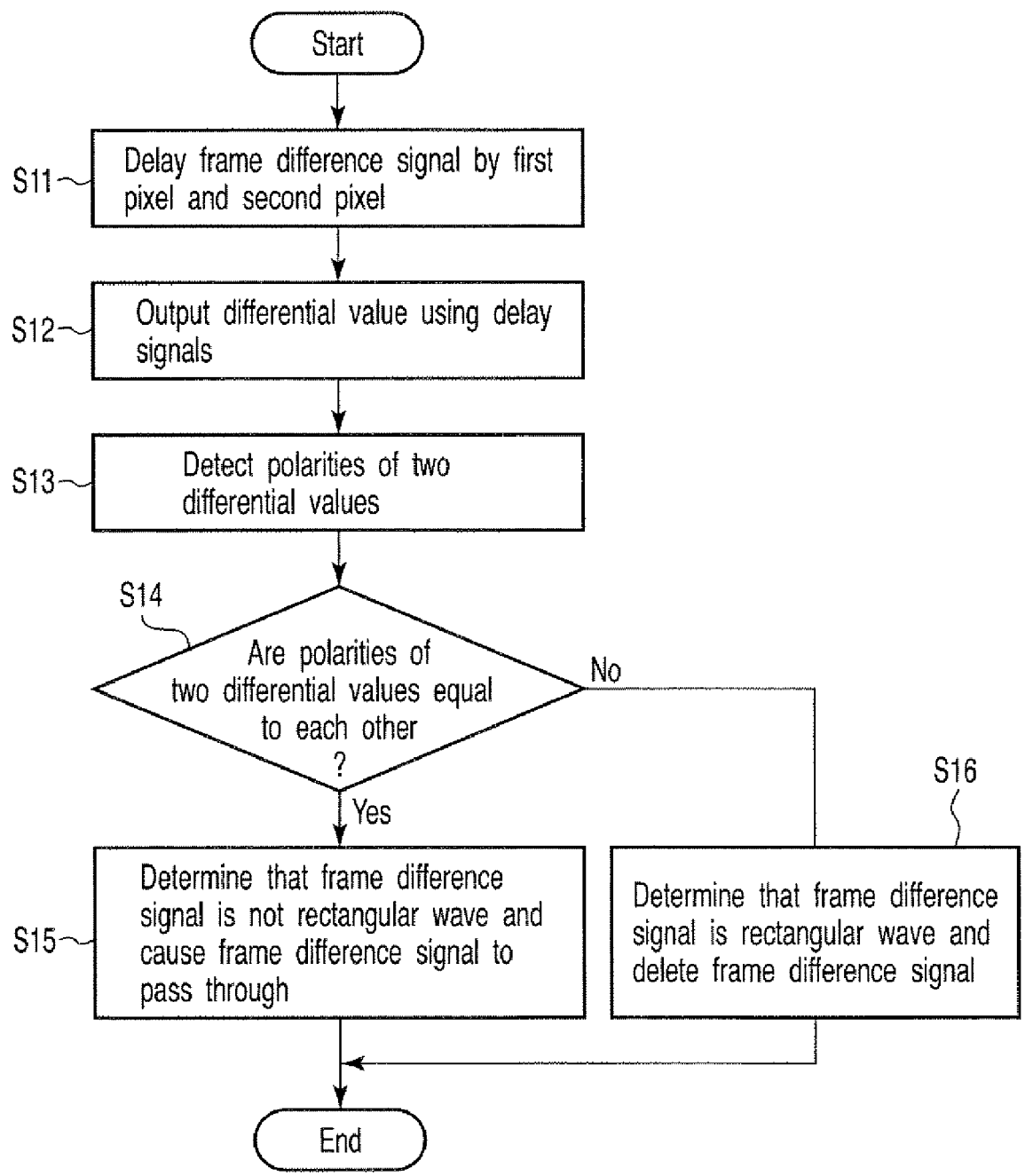
FIG. 5 is a flow chart showing an example of a rectangular wave removing process of a single pulse detecting unit which is a main configuration of a noise reducing circuit according to an embodiment of the present invention.

An outline of a general operation of the rectangular wave removal described above will be described below with reference to the flow chart. FIG. 5 is a flow chart showing an example of a rectangular wave removing process of a single pulse detecting unit which is a main configuration of a noise reducing circuit according to an embodiment of the present invention.

In step S11, the rectangular wave removing unit 41 generates the first delay signal D1 obtained by delaying the frame difference signal c by a predetermined first pixel. The second delay signal D2 obtained by delaying the frame difference signal c by a second pixel is generated. In step S12, the rectangular wave removing unit 41 outputs two differential values by using the frame difference signal c, the first delay signal D1, and the second delay signal D2. In step S13, the polarities of the two differential values are detected. In step S14, it is determined whether the polarities of the two differential values are equal to each other.

When Yes in step S14, that is, when the polarities of both the differential values are equal to each other, the rectangular wave removing unit 41 determines that the frame difference signal c given for the first time is not a rectangular wave in step S15 to shift to the latter part. When No in step S14, that is, when the polarities of both the differential values are different from each other, the rectangular wave removing unit 41 determines that the frame difference signal c given for the first time is a rectangular wave in step S16 to remove a rectangular wave component.

In this manner, in the first single pulse detecting unit 33, removal of a rectangular wave which is a hindrance when a single pulse is detected is executed to make it possible to improve accuracy of detection of a single pulse in the latter part.

The steps in the flow chart in FIG. 5 can be replaced by circuit blocks, respectively. Therefore, all the steps in the flow chart can be redefined as blocks. More specifically, a general operation of the rectangular wave removing unit 41 of the first single pulse detecting unit 33 is not limited to the concrete embodiment of the rectangular wave removing unit 41 in FIG. 3. As the general operation, only the operation described above may be performed.

[Pulse Discriminating Unit]

An operation of the pulse discriminating unit 42-1 will be described below with reference to FIGS. 3 and 4.

The pulse discriminating unit 42-1 includes a delay circuit 61, a delay circuit 62, an adder 65, and an adder 66.

The delay circuit 61 generates a delay signal D4 obtained by delaying a signal F (to be referred to as a "video signal D3" hereinafter) output from the rectangular wave removing unit 41. The delay circuit 62 outputs a delay signal D5 obtained by delaying the delay signal D4 output from the delay circuit 61. The adder 65 adds the video signal D3 and the delay signal D4 to each other to generate an output G. The adder 66 adds the delay signal D4 and the delay signal D5 to each other to generate an output H.

The output G is input to an absolute value unit 69. The absolute value unit 69 generates an absolute value signal G' obtained by converting a negative signal of the output G into a positive signal. The output H is input to an absolute value unit 70. The absolute value unit 70 generates an absolute value signal H' obtained by converting a negative signal of the output H into a positive signal. The minimum value selecting unit 72 selects a smaller one of the absolute value signal G' and the absolute value signal H' to output the selected signal as a signal J. As shown in FIG. 4, with the above processes, as the signal J, only the single pulse signal and the first and last pulse signals of the continuous pulse signals are extracted.

On the other hand, the delay signal D4 output from the delay circuit 61 is input to an absolute value unit 75 and a sign extracting unit 76. The absolute value unit 75 generates an absolute value signal D4' obtained by converting a negative signal of the delay signal D4 into a positive signal. A minimum value selecting unit 74 selects a smaller one of the signal J and the absolute value signal D4' to generate an output signal L.

The sign extracting unit 76 extracts sign information of the delay signal D4. For example, a sign is "+" when the delay signal D4 is positive, and a sign is "−" when the delay signal D4 is negative. The extracted sign information is sent to a sign adding unit 77. The sign adding unit 77 adds the extracted sign information to the output signal L to generate an output signal M1 having an original sign. In this case, as the output signal M1, not only a single pulse signal, but also the first and last pulse signals of continuous pulse signals are extracted. However, since almost pulse trains are removed in the continuous pulse signals, even though the first and last pulse signals of the continuous pulse signals are removed from the original video signal, an actual video image is hardly adversely affected.

The output signal M1 is further supplied to a limiter unit 78. In the limiter unit 78, an amplitude value of the output signal M1 is limited within a predetermined range as shown by a graph 79 in FIG. 3, and a signal is output as a more appropriate output signal N (single pulse component d in FIG. 1).

The limiter unit 78 is a converting circuit which converts an input signal by using the characteristics shown by the graph 79. In the graph 79, the abscissa expresses an input value, and the ordinate expresses an output value. According to the characteristics, when the input value falls within the range of −4 to +4, the input is output without being changed. When the input value falls out of the range, the output value is limited to a predetermined value. Furthermore, when the input value is large, the output value is set to be smaller than the predetermined value or set to be 0.

In this manner, the output value is limited because handling in the subsequent signal processing circuit is considered. The signal having the predetermined value or more is removed to be prevented from being handled as noise because the signal may be a video signal rather than noise.

Figure 6:
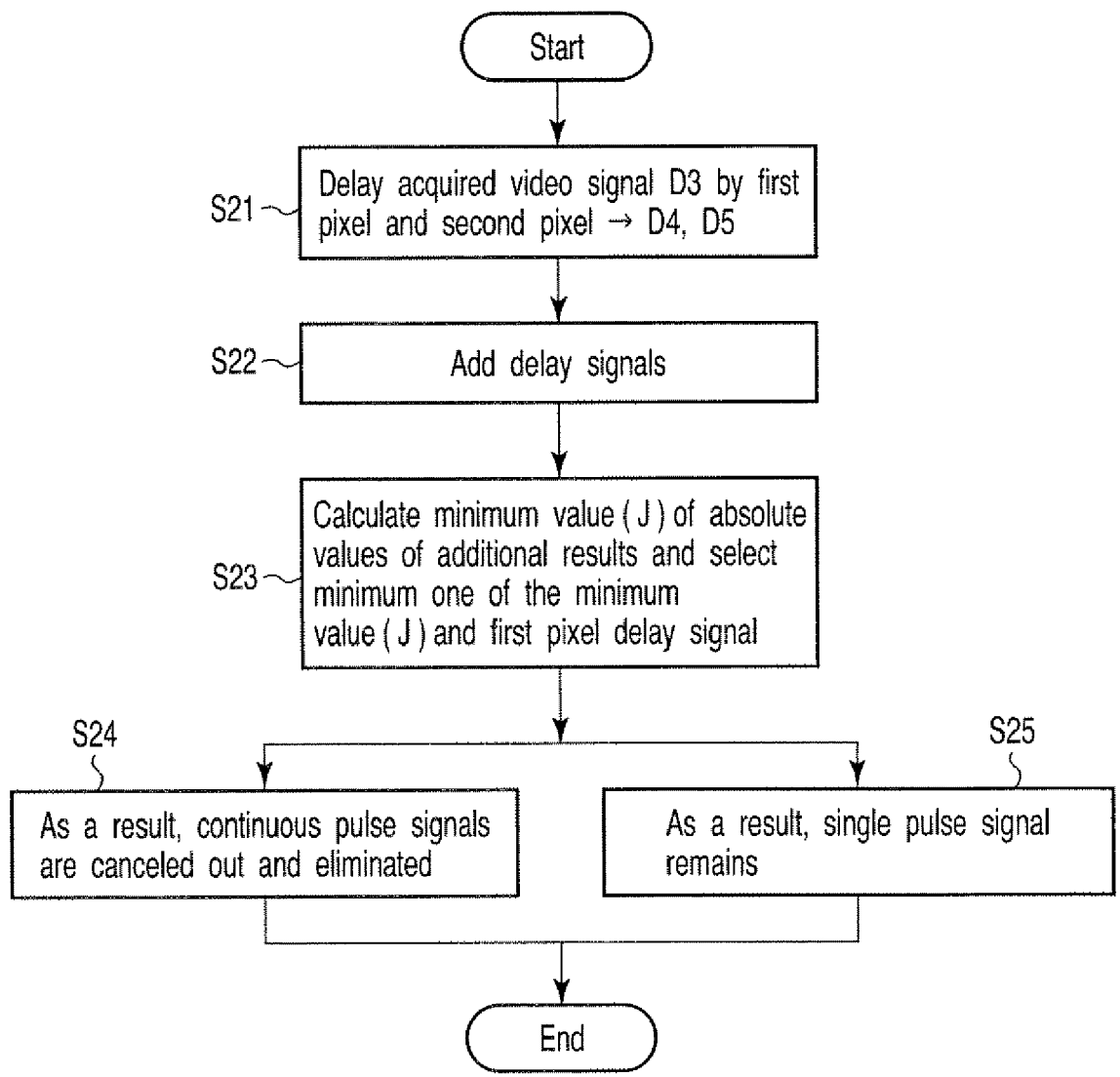
FIG. 6 is a flow chart showing an example of a separating process of continuous pulse signals and a single pulse signal of a single pulse detecting unit which is a main configuration of a noise reducing circuit according to an embodiment of the present invention.

An outline of a general operation of the pulse discriminating process described above will be described below with reference to a flow chart. FIG. 6 is a flow chart showing an example of a pulse discriminating process of a single pulse detecting unit which is a main configuration of a noise reducing circuit according to an embodiment of the present invention.

In step S21, the first delay signal D4 obtained by delaying the video signal D3 by a predetermined first pixel is generated, and the second delay signal D5 obtained by delaying the video signal D3 by a second pixel is generated. In step S22, the pulse discriminating unit 42-1 adds the video signal D3 and the first delay signal D4 to each other and adds the first delay signal D4 and the second delay signal D5 to each other. In step S23, the pulse discriminating unit 42-1 calculates a minimum value (J) of absolute values of the additional results and compares the minimum value (J) with the absolute value of the first delay signal D4 to select a minimum one.

As a result, in step S24, continuous pulse signals of the frame difference signal c are canceled out and removed. In step S25, a single pulse signal M1 is extracted.

The steps in the flow chart in FIG. 6 can be replaced with circuit blocks, respectively. Therefore, all the steps in the flow chart can be redefined as blocks. More specifically, a general operation of the pulse discriminating unit 42-1 of the first single pulse detecting unit 33 is not limited to the concrete embodiment of the pulse discriminating unit 42-1 in FIG. 3. As the general operation, only the operation described above may be performed.

The second single pulse detecting unit 34 will be described below. As described above, the second single pulse detecting unit 34 detects a size of a single pulse included in a video signal a, and generates an output f expressing, for example, a 0 to 1 time coefficient depending on an amplitude of the detected pulse. The second single pulse detecting unit 34 has the same configuration as that of the first single pulse detecting unit 33 except for the configuration of the limiter unit 78. Therefore, the same reference numerals as in the first single pulse detecting unit 33 denote the same parts in the second single pulse detecting unit 34, detailed explanation of the second single pulse detecting unit 34 will not be repeated here.

Figure 7:
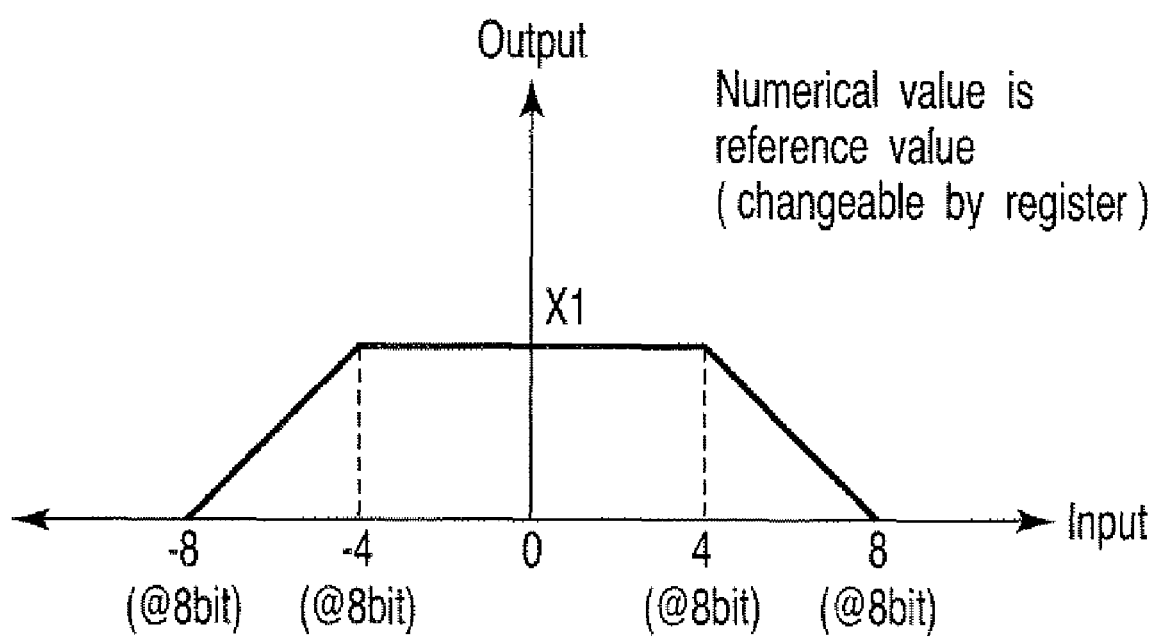
FIG. 7 is a graph showing an example of input/output characteristics of a single pulse detecting unit which is a main configuration of the noise reducing circuit according to an embodiment of the present invention.

FIG. 7 is a diagram showing input/output characteristics of the limiter unit 78 of the second single pulse detecting unit 34. In the graph shown in FIG. 7, an x-axis direction expresses a size of an input signal, and a y-axis direction expresses a size of an output signal. According to the characteristics, a positive value (coefficient value) is output independently of the polarity of the input value When the input value falls within the range of −4 to +4, the coefficient value is a constant value. When the input value falls out of the ranger the coefficient value is set to be smaller than a predetermined value or set to 0.

In this manner, the limiter unit of the first single pulse detecting unit 33 and the limiter unit of the second single pulse detecting unit 34 are different from each other in input/output characteristic. For this reason, the second single pulse detecting unit 34 can output a signal representing a ratio of subtraction of a noise component detected from the frame difference signal from the present signal by the second single pulse detecting unit 34.

Second Embodiment

A noise reducing circuit 21 according to a second embodiment of the present invention will be described below. The noise reducing circuit 21 according to the second embodiment is configured to remove a single pulse and continuous pulses. In the second embodiment, configurations of single pulse detecting units 33 and 34 are different from those of the first embodiment. Therefore, the same reference numerals as in the first embodiment denote the same parts in the second embodiment, and a detailed description thereof will not be repeated here.

Figure 8:
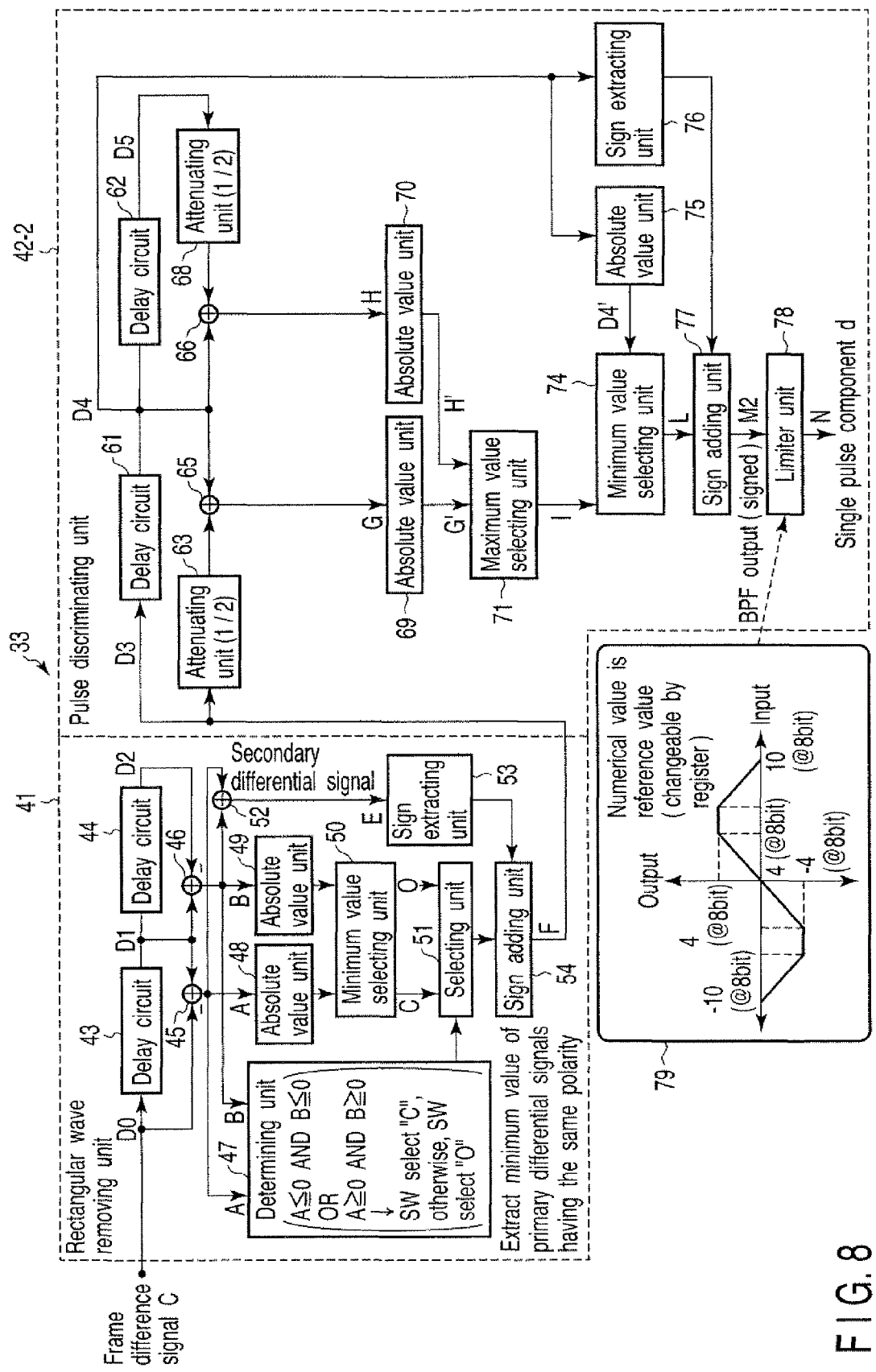
FIG. 8 is a block diagram showing an example of a configuration of a single pulse detecting unit which is a main configuration of a noise reducing circuit according to an embodiment of the present invention.
Figure 9:
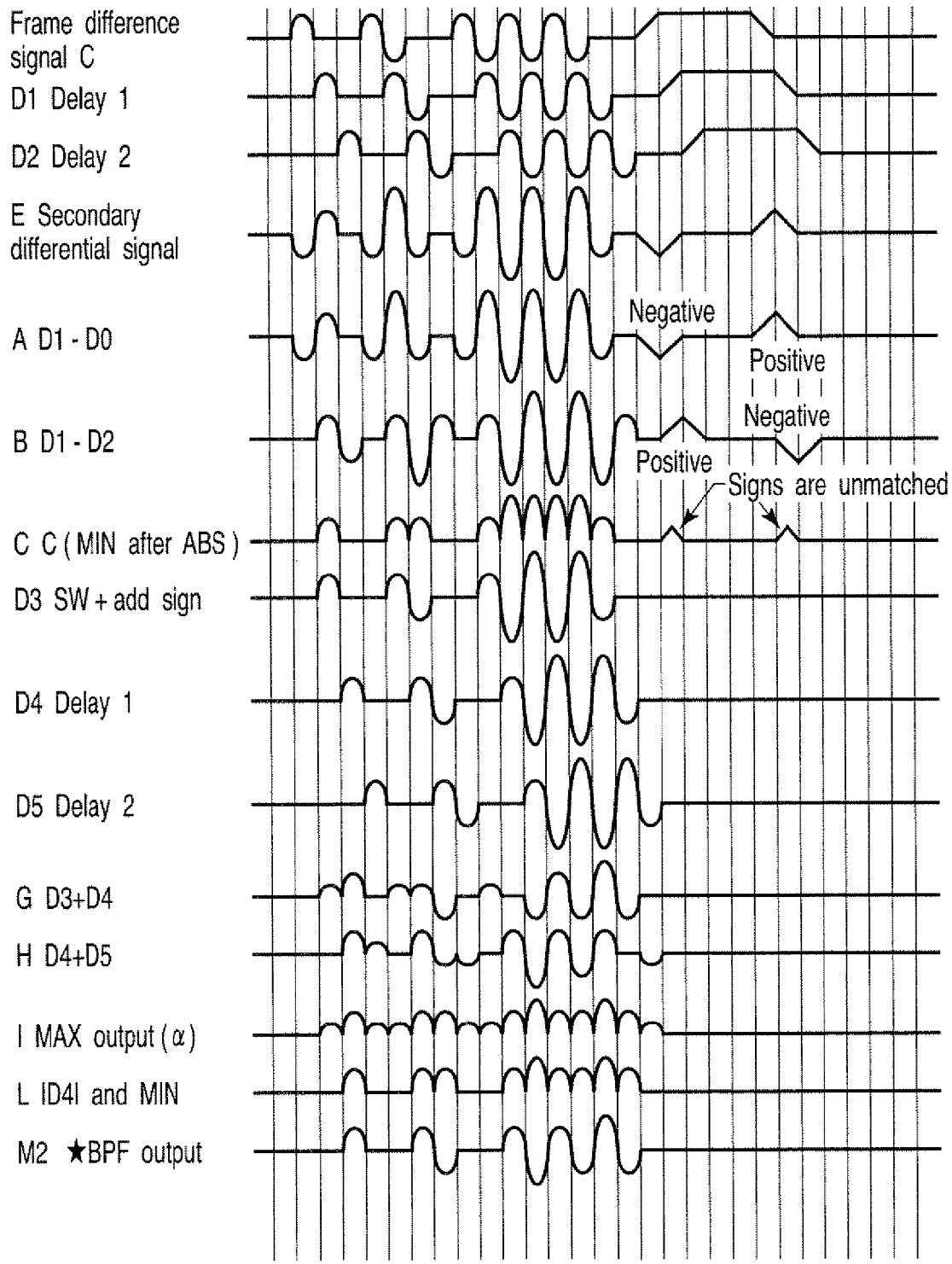
FIG. 9 is a timing chart showing an example of an operation of a single pulse detecting unit which is a main configuration of a noise reducing circuit according to an embodiment of the present invention.

FIG. 8 is a block diagram showing an example of a configuration of the first single pulse detecting unit 33 which is a main configuration of the noise reducing circuit according to the second embodiment of the present invention. FIG. 9 is a timing chart showing an example of an operation of the first single pulse detecting unit 33 according to an embodiment of the present invention. The configuration and the operation of the first single pulse detecting unit 33 will be described below with reference to FIGS. 8 and 9.

[Rectangular Wave Removing Unit]

Since the configuration of the rectangular wave removing unit 41 of the first single pulse detecting unit 33 shown in FIG. 8 is the same configuration of the first embodiment, a description thereof will not be repeated here.

[Pulse Discriminating Unit]

A pulse discriminating unit 42-2 shown in FIG. 8 extracts a region of a single pulse signal and a region of continuous pulse signals.

The pulse discriminating unit 42-2 includes a delay circuit 61, a delay circuit 62, an attenuating unit 63, an adder 65, an attenuating unit 68, and an adder 66.

The delay circuit 61 delays a video signal D3. The delay circuit 62 delays a delay signal D4 output from the delay circuit 61. The attenuating unit 63 receives the video signal D3 to attenuate the video signal D3 to ½. The adder 65 adds the attenuated video signal D3 and the delay signal D4 to each other to generate an output G. The attenuating unit 68 receives a delay signal D5 output from the delay circuit 62 to attenuate the delay signal D5 to ½. The adder 66 adds the delay signal D4 and the attenuated delay signal D5 to each other to generate an output H.

An output G is input to the absolute value unit 69. The absolute value unit 69 generates an absolute value signal G' obtained by converting a negative signal of the output G into a positive signal. The output H is input to the absolute value unit 70. The absolute value unit 70 generates an absolute value signal H' obtained by converting a negative signal of the output H into a positive signal. A maximum value selecting unit 71 selects a larger one of the absolute value signal G' and the absolute value signal H' to output the selected signal as a signal I. As shown in FIG. 9, with the above processes, as the signal I, only the single pulse signal and the continuous pulse signals are extracted.

On the other hand, the delay signal D4 output from the delay circuit 61 is input to an absolute value unit 75 and a sign extracting unit 76. The absolute value unit 75 generates an absolute value signal D4' obtained by converting a negative signal of the delay signal D4 into a positive signal. A minimum value selecting unit 74 selects a smaller one of the signal I and the absolute value signal D4' to generate an output signal L.

The sign extracting unit 76 extracts sign information of the delay signal D4. For example, a sign is "+" when the delay signal D4 is positive, and a sign is "−" when the delay signal D4 is negative. The extracted sign information is sent to a sign adding unit 77. The sign adding unit 77 adds the extracted sign information to the output signal L to generate an output signal M2 having an original sign. As a result, as shown in FIG. 9, as an output signal M2, not only a single pulse signal but also continuous pulse signals are extracted.

The output signal M2 is further supplied to a limiter unit 78. In the limiter unit 78, an amplitude value of the output signal M2 is limited within a predetermined range as shown by a graph 79 in FIG. 8, and a signal is output as a more appropriate output signal N (single pulse component d in FIG. 1).

Figure 10:
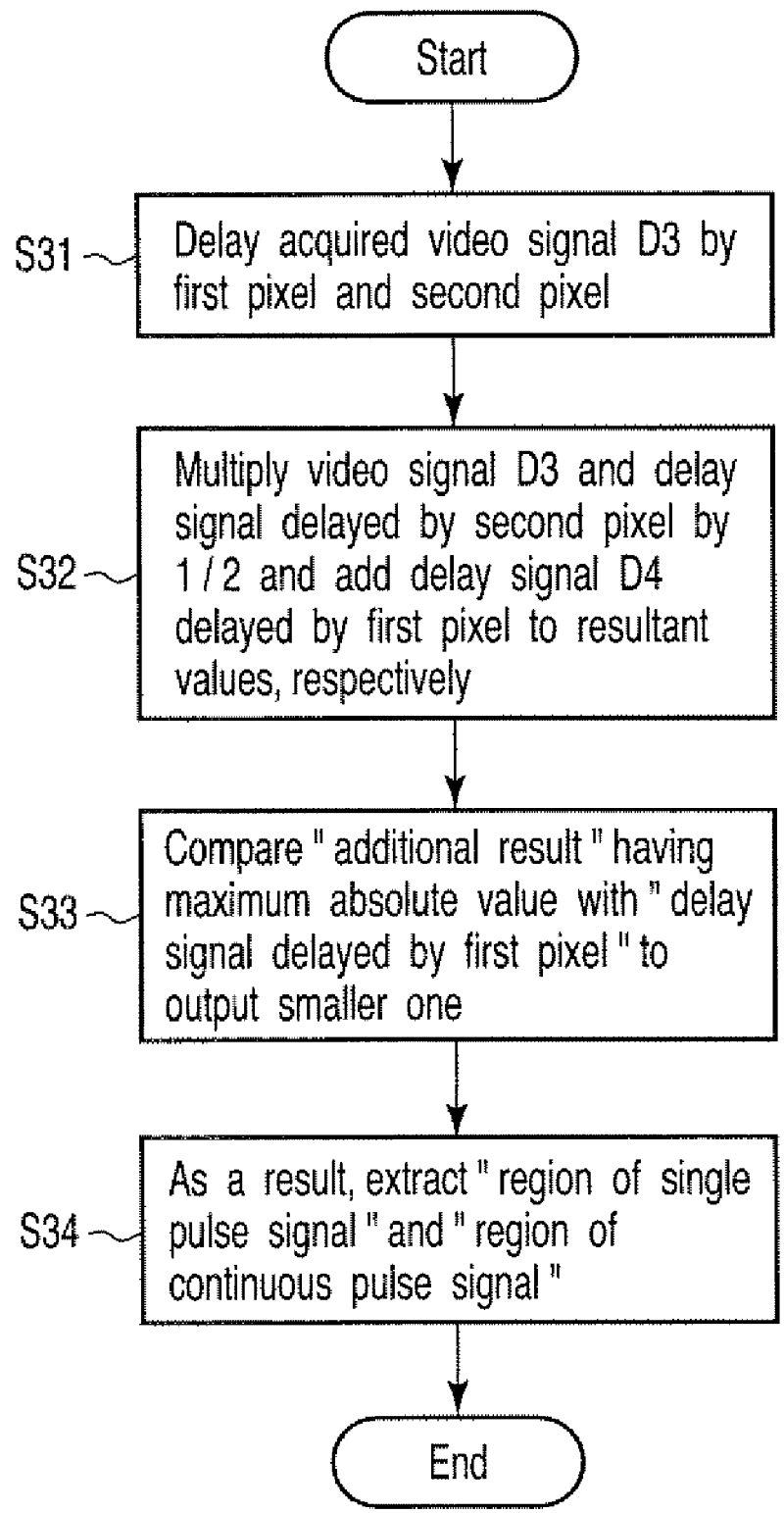
FIG. 10 is a flow chart showing an example of a detecting process for continuous pulse signals and a single pulse signal in a single pulse detecting unit which is a main configuration of a noise reducing circuit according to an embodiment of the present invention.

An outline of a general operation of the pulse discriminating process described above will be described below with reference to a flow chart. FIG. 10 is a flow chart showing an example of a pulse discriminating process of a single pulse detecting unit which is a main configuration of a noise reducing circuit according to an embodiment of the present invention.

In step S31, the pulse discriminating unit 42-2 generates a first delay signal D4 obtained by delaying the video signal D3 by a predetermined first pixel and generates the second delay signal D5 obtained by delaying the video signal D3 by a second pixel. In step S32, the pulse discriminating unit 42-2 makes the video signal D3 and the delay signal DS ½ to add the delay signal D4 to each of the ½ video signal D3 and the ½ delay signal DS.

In step 533, the pulse discriminating unit 42-2 calculates a maximum value (I) of absolute values of additional results and selects a minimum one of the maximum value (I) and the first delay signal D4. As a result, in step S34, the pulse discriminating unit 42-2 can generate a signal M2 including a "region of a single pulse signal" and a "region of continuous pulse signals".

The steps in the flow chart in FIG. 10 can be replaced with circuit blocks, respectively. Therefore, all the steps in the flow chart can be redefined as blocks. More specifically, a general operation of the pulse discriminating unit 42-2 of the first single pulse detecting unit 33 is not limited to the concrete embodiment of the pulse discriminating unit 42-2 in FIG. 8. As the general operation, only the operation described above may be performed.

Third Embodiment

Figure 11:
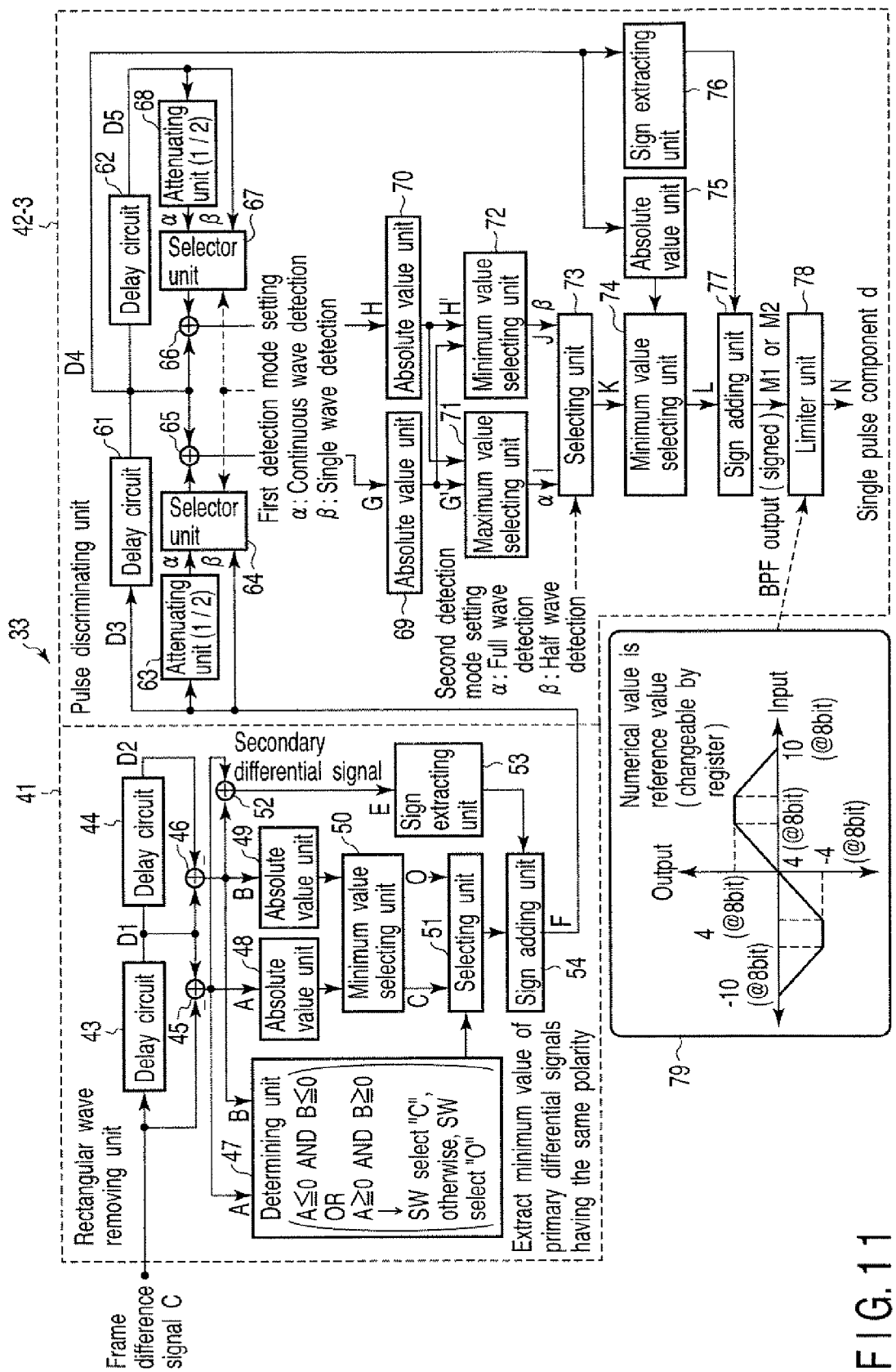
FIG. 11 is a block diagram showing an example of a configuration of a single pulse detecting unit which is a main configuration of a noise reducing circuit according to an embodiment of the present invention.

A noise reducing circuit 21 according to a third embodiment of the present invention will be described below. The noise reducing circuit 21 according to the third embodiment is configured to select a mode (β mode) in which a single pulse is removed and a mode (α mode) in which a single pulse and continuous pulses are removed. In the third embodiment, the configurations of the single pulse detecting units 33 and 34 are different from those of the first embodiment. Therefore, the same reference numerals as in the first embodiment denote the same parts in the third embodiment, and a detailed description thereof will not be repeated here FIG. 11 is a block diagram showing an example of a configuration of the first single pulse detecting unit 33 which is a main configuration of the noise reducing circuit according to the third embodiment of the present invention. The configuration and the operation of the first single pulse detecting unit 33 will be described below with reference to FIGS. 11, 4, and 9.

[Rectangular Wave Removing Unit]

Since the configuration of the rectangular wave removing unit 41 of the first single pulse detecting unit 33 shown in FIG. 11 is the same configuration of the first embodiment, a description thereof will not be repeated here.

[Pulse Discriminating Unit]

A pulse discriminating unit 42-3 shown in FIG. 11 is configured to switch the configuration of the pulse discriminating unit 42-1 in FIG. 3 and the configuration of the pulse discriminating unit 42-2 in FIG. 8 by a selector unit 64, a selector unit 67, and a selecting unit 73. In this case, any one of the α mode and the β mode can be switched by an external operation performed by a user. With this configuration, by selection signals α and β, two functions including a "function of detecting a single pulse" or a "function of detecting a single pulse and continuous pulses" can be arbitrarily switched.

More specifically, when a first detection mode setting is α, an output G is a signal obtained by adding D3×½ to D4, and an output H is a signal obtained by adding D4 to D5×½. Of values obtained by converting the output G and the output H into absolute values, the maximum value is output as a signal I, and the minimum value is output as a signal J.

On the other hand, when a first detection mode setting is β, an output G is a signal obtained by adding D3 and D4 to each other, and an output H is a signal obtained by adding D4 and D5 to each other. Of values obtained by converting the output G and the output H into absolute values, the maximum value is output as a signal I, and the minimum value is output as a signal J.

When a second detection mode setting is a, the signal I of the maximum value is selected and output as a signal K.

When the second detection mode setting is β, the signal J of the minimum value is selected, and a value obtained by converting D4 into an absolute value is compared with the signal K to output a smaller one as a signal L. An output M (M1, M2) obtained by adding a sign of D4 to the signal L is corrected in an output signal level by an input/output converting process of the limiter unit 78.

As described above, with the configuration of the pulse discriminating unit 42-3 shown in FIG. 11, two functions including a function of detecting a single pulse depending on the selection signals α and β and a function of detecting a single pulse and continuous pulses can be arbitrarily switched.

Figure 12:
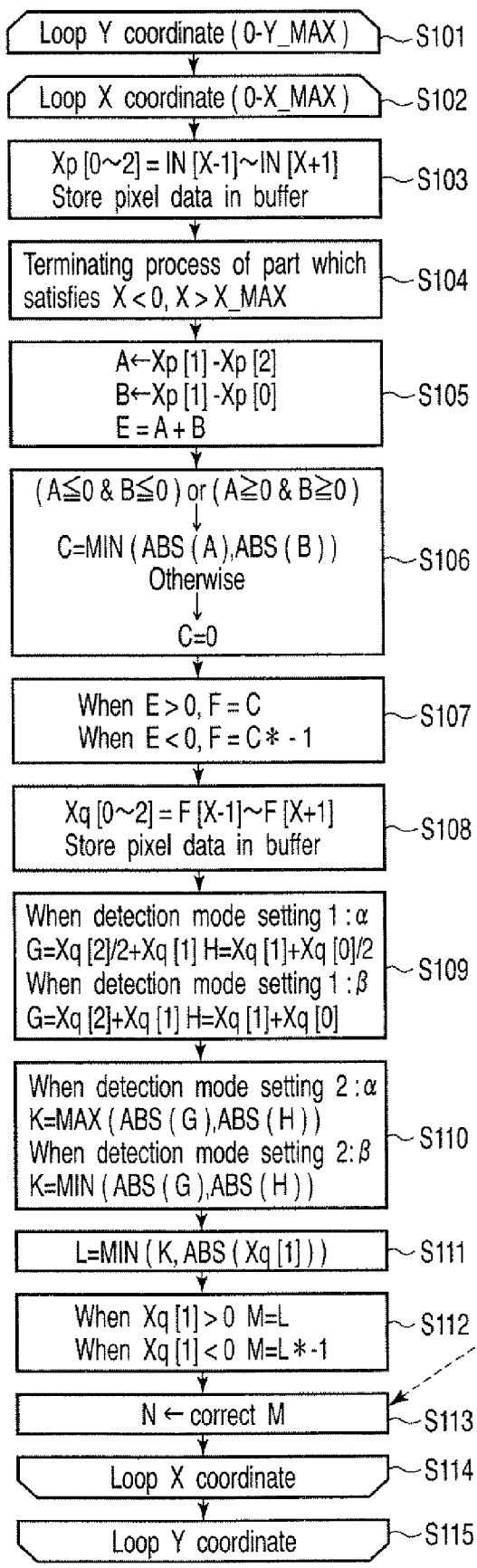
FIG. 12 is a flow chart showing an example given when an operation of a single pulse detecting unit which is a main configuration of a noise reducing circuit according to an embodiment of the present invention is realized by a computer program.
Figure 12:
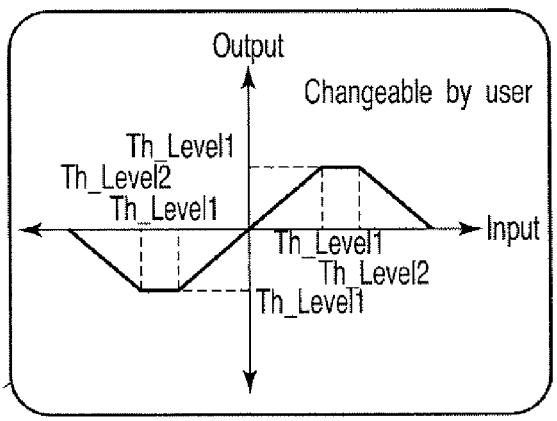

An outline of a general operation of the single pulse detecting process described above will be described below with reference to a flow chart. FIG. 12 is a flow chart showing an example of a rectangular wave removing process and a pulse discriminating process of a single pulse detecting unit which is a main configuration of a noise reducing circuit according to an embodiment of the present invention.

In steps S101 and S102, a loop Y coordinate and a loop X coordinate are defined. In this case, a Y coordinate and the X coordinate correspond to a screen of a video image. Therefore, in a high-definition image, coordinates are defined as 1920×1080 at a maximum by using pixels as units.

A rectangular wave removing process is executed first. In step S103, pixel data of an alignment IN defined by coordinates is stored as an alignment Xp of a buffer. Furthermore, in step S104, end portions of a screen, i.e., portions given by X<0 and X>X_MAX are terminated. In step S105, differences A and B between delay signals shown in FIG. 4 and a secondary differential signal E are calculated. In steps S106 and S107, a polarity is determined, and a signal is output to a latter part without being specially processed depending on the polarity, or the signal is set to 0 to perform a rectangular wave excluding process.

A pulse discriminating process is executed. In step S108, pixel data of an alignment F defined by coordinates is stored as an alignment Xq of the buffer to perform a delay process and an arithmetic process. In steps S109 and S110, depending on the detection mode setting by αor β, a maximum value or a minimum value of the absolute values of the delay signals is calculated. In step S111, a minimum value L is calculated. A sign is rationalized in step S112, and the limiter process is performed in step S113.

In steps S114 and S115, these processes are performed with respect to the loop X coordinate and the loop Y coordinate. More specifically, these processes are executed to all pixel data.

The steps in the flow chart in FIG. 12 can be replaced by circuit blocks, respectively. Therefore, all the steps in the flow chart can be redefined as blocks. More specifically, in a general operation of the first single pulse detecting unit 33, without the concrete circuit as shown in FIG. 11, the single pulse or the "region of the single pulse signal and the region of the continuous pulse signals" M2 can be detected by performing the same processes as described above by a computer program and a computer.

Fourth Embodiment

A noise reducing circuit 21' according to a fourth embodiment of the present invention will be described below. In the noise reducing circuit 21'according to the fourth embodiment, a video signal of a current frame from which a single pulse is removed is output, and a video signal of a delay frame from which a single pulse is removed is output.

FIG. 13 is a block diagram showing a configuration of a noise reducing circuit 21' of the fourth embodiment according to an embodiment of the present invention. FIG. 14 is a timing chart showing an example of an operation of the noise reducing circuit 21' according to an embodiment of the present invention. A configuration and operation of the noise reducing circuit 21' will be described below with reference to FIGS. 13 and 14.

The noise reducing circuit 21' includes a frame memory 31, a single pulse detecting unit 142, a single pulse detecting unit 143, a single pulse detecting unit 144, and an adder 141 which adds one terminals of these units. Further more, the noise reducing circuit 21' includes a multiplier 145 to which outputs of the single pulse detecting unit 143 and the single pulse detecting unit 142 are connected, a multiplier 146 to which the single pulse detecting unit 143 and the single pulse detecting unit 144 are connected, an adder 147, and an adder 148.

In this case, the noise reducing circuit 21' shown in FIG. 13 includes the configuration of the noise reducing circuit 21 shown in FIG. 1. The single pulse detecting unit 143 and the single pulse detecting unit 144 correspond to the first single pulse detecting unit 33 and the second single pulse detecting unit 34 in FIG. 1, respectively, and the multiplier 146 and the adder 148 correspond to the multiplier 35 and the adder 36 in FIG. 1, respectively.

On the other hand, the single pulse detecting unit 142, the multiplier 145, and the adder 147 perform operations equivalent to that of the first single pulse detecting unit 33 in FIG. 1. However, since the single pulse detecting unit 142 receives only a delay frame signal from the frame memory 31, a noise-removed frame signal before one frame is obtained as an output from the adder 147.

When, for example, an IP converting circuit (not shown) is arranged in the latter part, the frame signal before one frame can be used in the IP converting circuit.

With the above configuration, a noise reducing process of a video signal in, for example, an image processing apparatus or the like can be performed by using the single pulse detecting unit 142 or the like.

[Video Apparatus using Noise Reducing Circuit according to Embodiment of the Present Invention]

An example of a video apparatus 10 using the noise reducing circuit 21 described above will be described below with reference to a drawing. FIG. 15 is a block diagram showing an example of a configuration of a video apparatus to which a noise reducing circuit according to an embodiment of the present invention is applied.

The video apparatus 10 includes a digital tuner 13 which receives signals from an antenna 11 and an antenna 12, analog tuner 14, an MPEG-2 decoder 15 connected to the digital tuner 13, an A/D converter 16 connected to the analog tuner 14, and an A/D converter 17 connected to an external connector. Furthermore, the video apparatus 10 has a signal select 18 to which these components are connected and a signal processing unit 19 connected to the signal select 18.

The signal processing unit 19 mentioned here is the video apparatus 10 including the noise reducing circuit 21 described above, a scaling unit serving as the latter part of the noise reducing circuit 21, a video processing unit 23 serving as the latter part of the scaling unit, a driver 24 serving as the latter part of the video processing unit 23, and a display unit 20 which receives a video signal from the driver 24 to perform display.

An MPEG-2 transport stream signal demodulated by the digital tuner 13 connected to the antenna 11 is subjected to a decoding process by the MPEG-2 decoder 15 and then input to the signal select 18. Similarly, a video signal demodulated by the analog TV tuner 14 connected to the antenna 12 is converted from an analog signal into a digital signal by the A/D converter 16 and then input to the signal select 18.

A video signal from an external video apparatus such as a VTR or a DVD player is converted from an analog signal into a digital signal by the A/D converter 17 and then input to the signal select 18.

The signal select 18 selects an input video signal by a selecting operation by a user to output the video signal to the signal processing unit 19.

The video signal input to the signal processing unit 19 passes through the noise reducing circuit 21 described above, a scaling process unit 22 which adjusts the number of pixels to the number of pixels of a display unit 20 with respect to the input video signal, and a video processing unit 23 which performs a contour correcting process or the like and is supplied to the display unit 20 through the driver 24 to display a video image.

Even in the video apparatus 10, in the noise reducing circuit 21 described above, by using a single pulse component reliably detected by removing a rectangular wave component from a noise component, noise of a single pulse component can be reliably removed from a video signal or the like. In this manner, since especially outstanding single pulse component noise on a video screen can be effectively removed, a vivid image display can be achieved.

According to the various embodiments described above, a person skilled in the art can realize the present invention. However, furthermore, the person skilled in the art can easily conceive various modifications of these embodiments, and can apply the present invention to various embodiments without inventive ability. Therefore, the present invention covers wide ranges consistent with the disclosed principle and the novel characteristics, and is not limited to the embodiments described above.

It is our intention that the invention be not limited to the specific details and representative embodiments shown and described herein, and in an implementation phase, this invention may be embodied in various forms without departing from the spirit or scope of the general inventive concept thereof. Various types of the invention can be formed by appropriately combining a plurality of constituent elements disclosed in the foregoing embodiments. Some of the elements, for example, may be omitted from the whole of the constituent elements shown in the embodiments mentioned above. Further, the constituent elements over different embodiments may be appropriately combined.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A noise reducing circuit comprising:
a frame memory configured to frame-delay a video signal;
a first arithmetic unit configured to subtract the frame-delayed video signal given by the frame memory from the video signal to output a frame difference signal;
a rectangular wave removing unit configured to remove a rectangular wave component from the frame difference signal;
a pulse discriminating unit configured to receive the frame difference signal from which the rectangular wave component is removed by the rectangular wave removing unit and remove a continuous pulse component from the frame difference signal to output a first single pulse component; and
a second arithmetic unit configured to subtract the first single pulse component from the video signal.

2. The noise reducing circuit according to claim 1, further comprising:
a single pulse detecting unit configured to receive the video signal and detect a second single pulse component; and
a multiplying unit configured to multiply the first single pulse component output from the pulse discriminating unit by the second single pulse component output from the single pulse detecting unit to output a multiplication result.

3. The noise reducing circuit according to claim 1, wherein the rectangular wave removing unit calculates a first delay video signal obtained by delaying the frame difference signal by a first pixel number and a second delay video signal obtained by delaying the frame difference signal by a second pixel number, calculates polarities of a differential signal formed from the video signal and the first delay video signal and a differential signal formed from the first delay video signal and the second delay video signal, removes the video signal when the polarities are different from each other, and passes the video signal when the polarities are equal to each other, to remove the rectangular wave component from the video signal.

4. The noise reducing circuit according to claim 1, wherein the pulse discriminating unit calculates a first delay video signal obtained by delaying the video signal by a first pixel number and a second delay video signal obtained by delaying the video signal by a second pixel number, adds the video signal and the second delay video signal to the first delay video signal to cancel out the continuous pulse component in the video signal, and causes the single pulse component to remain.

5. The noise reducing circuit according to claim 1, wherein the pulse discriminating unit calculates a first delay video signal obtained by delaying the video signal by a first pixel number and a second delay video signal obtained by delaying the video signal by a second pixel number, adds, to the first delay video signal, results of multiplying each of the video signal and the second delay video signal by ½, compares a large one of the addition results with the first delay video signal to output a small one, and extracts a signal value of a region of the single pulse component in the video signal and a signal value of a region of the continuous pulse component in the video signal.

6. The noise reducing circuit according to claim 1, wherein the pulse discriminating unit, when a first selection signal is received, calculates a first delay video signal obtained by delaying the video signal by a first pixel number and a second delay video signal obtained by delaying the video signal by a second pixel number, adds the video signal and the second delay video signal to the first delay video signal to cancel out the continuous pulse component in the video signal, and causes the single pulse component to remain,
when a second selection signal is received, calculates a first delay video signal obtained by delaying the video signal by the first pixel number and a second delay video signal obtained by delaying the video signal by the second pixel number, adds, to the first delay video signal, results of multiplying each of the video signal and the second delay video signal by ½, compares a large one of the addition results with the first delay video signal to output a small one, and extracts a signal value of a region of the single pulse component in the video signal and a signal value of a region of the continuous pulse component in the video signal.

7. The noise reducing circuit according to claim 1, further comprising:
a limiter unit which limits an amplitude value of the single pulse component to be output from the pulse discriminating unit and supplies the single pulse component to the second arithmetic unit.

8. A video apparatus comprising:
a tuner unit configured to receive a broadcasting signal to output a video signal;
a frame memory configured to frame-delay the video signal from the tuner unit;
a first arithmetic unit configured to subtract the frame-delayed video signal given by the frame memory from the video signal to output a frame difference signal;
a rectangular wave removing unit configured to remove a rectangular wave component from the frame difference signal;
a pulse discriminating unit configured to receive the frame difference signal from which the rectangular wave component is removed by the rectangular wave removing unit and remove a continuous pulse component from the frame difference signal to output a single pulse component;
a second arithmetic unit configured to subtract the single pulse component from the video signal; and
a display unit configured to display a video image on a screen depending on the video signal obtained by subtracting the single pulse component from the video signal.

9. A noise reducing method comprising:
frame-delaying a video signal by a memory circuit;
outputting a frame difference signal obtained by subtracting the frame-delayed video signal from the video signal by a first arithmetic unit;
removing a rectangular wave component from the frame difference signal by a rectangular wave removing unit;
receiving the frame difference signal from which the rectangular wave component is removed and removing a continuous pulse component from the frame difference signal by a pulse discriminating unit, and to output a single pulse component; and
subtracting the single pulse component from the video signal by a second arithmetic unit.

* * * * *